（12) United States Patent
Perrin et al.

(10) Patent No.: US 7,987,868 B2
(45) Date of Patent: Aug. 2, 2011

(54) DECOUPLED HOUSING SEAT

(75) Inventors: Jean-Luc Perrin, Girmont (FR); Yannick Prebost, Charmes (FR)

(73) Assignee: Honeywell International Inc., Morristown, NJ (US)

( * ) Notice: Subject to any disclaimer, the term of this patent is extended or adjusted under 35 U.S.C. 154(b) by 410 days.

(21) Appl. No.: 12/064,839

(22) PCT Filed: Aug. 26, 2005

(86) PCT No.: PCT/US2005/030372
§ 371 (c)(1),
(2), (4) Date: Feb. 26, 2008

(87) PCT Pub. No.: WO2007/024226
PCT Pub. Date: Mar. 1, 2007

(65) Prior Publication Data
US 2008/0196765 A1 Aug. 21, 2008

(51) Int. Cl.
*F02M 25/07* (2006.01)
(52) U.S. Cl. ............... 137/15.18; 251/282; 251/325; 251/363
(58) Field of Classification Search ............. 251/324, 251/325, 282, 129.07, 363; 137/15.18
See application file for complete search history.

(56) References Cited

U.S. PATENT DOCUMENTS

| | | | | |
|---|---|---|---|---|
| 3,071,344 A | * | 1/1963 | Banks | 251/332 |
| 3,327,991 A | * | 6/1967 | Wallace | 251/172 |
| 3,763,890 A | | 10/1973 | Wolf | |
| 3,892,384 A | * | 7/1975 | Myers | 251/282 |
| 4,474,208 A | * | 10/1984 | Looney | 251/332 |
| 5,685,519 A | * | 11/1997 | Bircann et al. | 251/129.15 |
| 5,701,874 A | * | 12/1997 | Sari et al. | 251/129.07 |
| 5,718,440 A | * | 2/1998 | Roxbury | 280/47.131 |
| 6,062,535 A | * | 5/2000 | Ruth et al. | 251/123 |
| 6,213,106 B1 | | 4/2001 | Hakansson | |
| 6,217,001 B1 | * | 4/2001 | Gluchowski et al. | 251/129.07 |

FOREIGN PATENT DOCUMENTS

FR 9413759 11/1994
FR 0451580 7/2004

OTHER PUBLICATIONS

PCT ISR/Honeywell.

* cited by examiner

*Primary Examiner* — John Bastianelli
(74) *Attorney, Agent, or Firm* — Alston & Bird LLP

(57) ABSTRACT

An exhaust gas valve assembly includes a housing defining a cavity therein and having an intake port and an exhaust port. A valve seat has a first axial end secured to the housing and a second axial end that is disposed within but decoupled a distance from the housing. The second axial end defines one or more apertures that provide fluid communication between the intake and exhaust ports. A seal is disposed between the second axial end of the valve seat and the housing so as to close the decoupled distance therebetween. A piston is received within and is axially movable relative to the valve seat so as to open and close the one or more apertures and thereby regulate exhaust gas flow between the intake and exhaust ports.

15 Claims, 2 Drawing Sheets

DECOUPLED HOUSING SEAT

CROSS-REFERENCE TO RELATED APPLICATION

Not applicable.

BACKGROUND OF THE INVENTION

1. Field of the Invention (Technical Field)

The present invention relates to piston seats disposed in housings for the management of exhaust gases, particularly those in exhaust gas valve assemblies and particularly in applications in which temperature cycles occur and affect components such as automotive applications.

2. Background Art

Currently, seats are assembled into housings at the compression end of a piston stroke. The seat is typically tightly fitted, often assembled into the housing under pressure. High mechanical and thermal loads due to valve attachment distort the housing in the area about the seat, resulting in excessive gas leaks. Thus, there is a need for ameliorating the problems caused by distortion in the housing.

BRIEF SUMMARY OF THE INVENTION

The present invention provides an exhaust gas valve assembly having a piston housing seat that is decoupled from the housing and a seal between the seat and the housing. Thus, as distortion occurs in the housing, exhaust gas is effectively managed and leaks are prevented, and as heat expands metal parts, the piston is prevented from becoming stuck. The guiding of the piston and the sealing to prevent leaks when valve is closed is decoupled from attachment of the valve by its inlet and outlet ports.

One embodiment of the present invention provides an exhaust gas valve assembly comprising a housing having an intake port, an exhaust port, and a substantially cylindrical cavity defined therein, a valve seat disposed within the cavity, said valve seat having a first axial end secured to the housing and a second axial end disposed within, but decoupled a distance from, the housing, said second axial end positioned between the intake and exhaust ports and including one or more apertures in fluid communication with the intake port and exhaust port, a piston received within the valve seat, said piston configured to reciprocate axially within the valve seat so as to open and close the apertures and thereby regulate exhaust gas flow between the intake port and the exhaust port, and a seal disposed between the housing and the valve seat proximate the second axial end of the valve seat, said seal closing the decoupled distance between the housing and valve seat.

In one embodiment, the seat is linked to a piston guide. In one embodiment, the seal comprises a flexible seal. The seal may comprise a curved, radiused sealing surface. The seal may comprise a ring. The seal may comprise a piston ring.

In yet another embodiment, the present invention comprises a method for managing exhaust gases comprising providing a housing having an intake port, an exhaust port, and a substantially cylindrical cavity defined therein, disposing a valve seat within the cavity, securing a first axial end of the seat to the housing, disposing in a decoupled manner a second axial end of the seat within, but a distance from, the housing, positioning the second axial end between the intake and exhaust ports and including one or more apertures in fluid communication with the intake port and the exhaust port, receiving a piston within the valve seat and configuring the piston to reciprocate axially within the valve seat so as to open and close the apertures and thereby regulate exhaust gas flow between the intake port and the exhaust port, and disposing a seal between the housing and the valve seat proximate the second axial end of the valve seat so that the seal closes the decoupled distance between the housing and valve seat. The seat may be linked to a piston guide.

The present invention is applicable to conditions wherein the housing is disposed in an environment subject to temperature cycles.

An object of the invention is to provide piston housing seat that maintains exhaust gas sealing integrity even as the housing distorts under thermal and mechanical loads.

Other objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into, and form a part of, the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
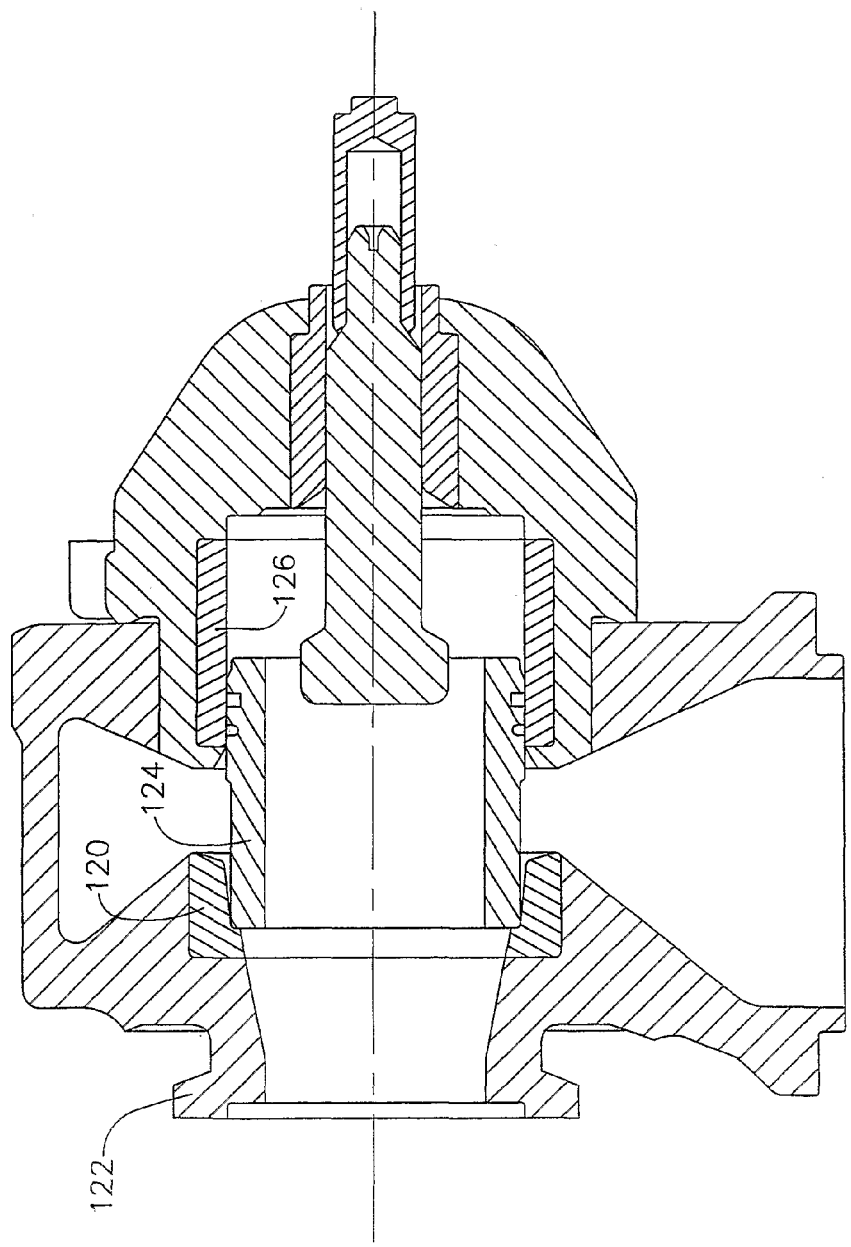
FIG. 1 shows an exhaust gas valve assembly of the prior art.

The present invention provides an exhaust gas valve assembly having a piston housing seat that is decoupled from the housing and a seal between the seat and the housing. As used herein, the term "piston" includes any sliding piece moved within a housing cavity. As shown in FIG. 1, the typical prior art comprises seat 120 assembled into housing 122. Seat 120 is tightly fitted into housing 122 and is often assembled into housing 122 under pressure. As piston 124 moves, the thermal and external mechanical load stresses cause housing 122 to distort, and being tightly connected to housing 122, seat 120 also distorts, causing exhaust gases to leak excessively. Another effect of such distortion is that as housing 122 expands under heat, piston 124 can become stuck in the compression stroke. As shown, piston guide 126 is not linked to seat 120.

Figure 2:
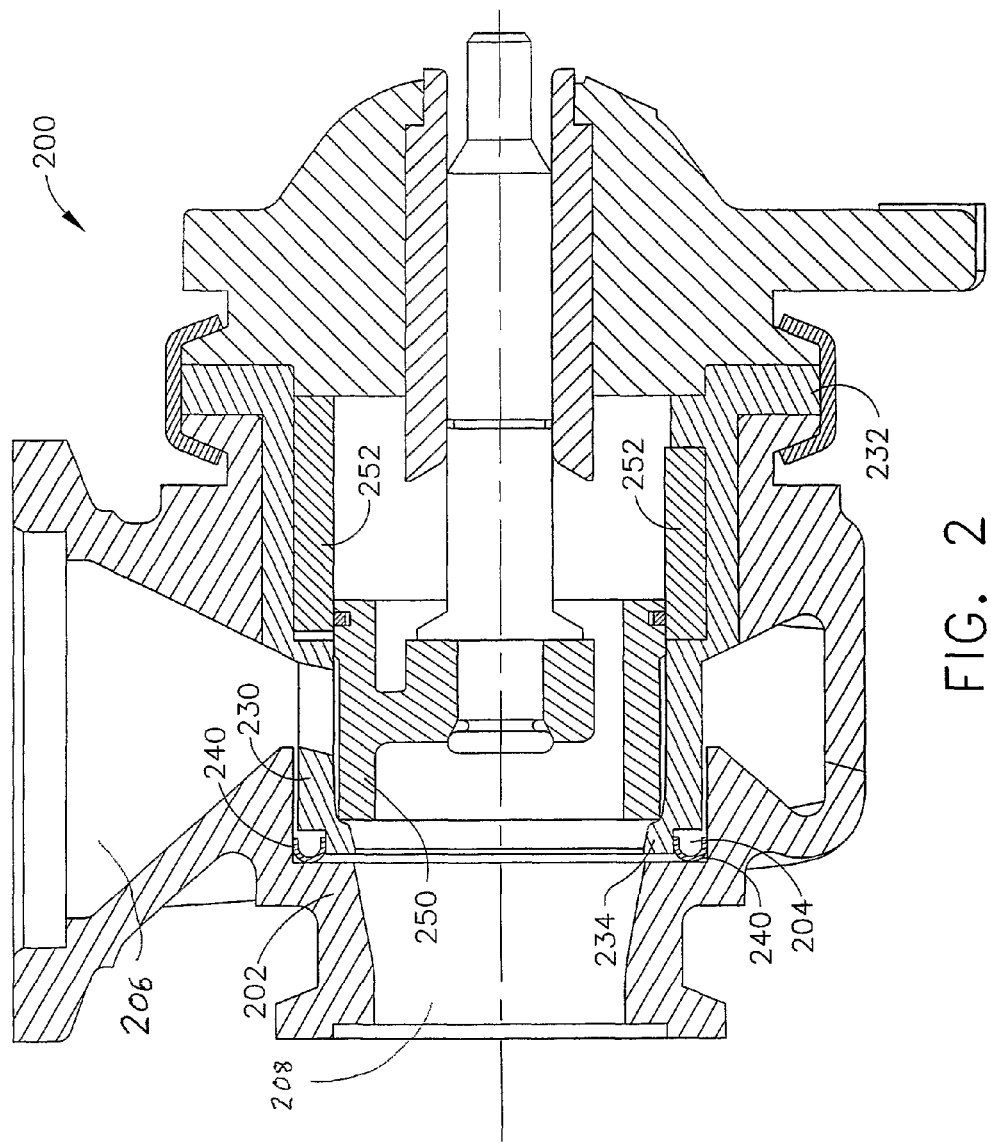
FIG. 2 shows an embodiment of the present invention.

Turning to FIG. 2, which depicts an embodiment of the present invention, exhaust gas valve assembly 200 comprises housing 202 having cavity 204, which is preferably cylindrical, intake port 206, and exhaust port 208. Seat 230 and seal 240 are disposed in cavity 204. In the embodiment depicted in FIG. 2 which, for illustrative purposes is discussed herein as representative of other embodiments wherein a piston moves within a housing, seat 230 is a valve seat. Seat 230 comprises first axial end 232 which is secured to housing 202 and second axial end 234 which is disposed within, but decoupled a distance from, housing 202. Second axial end 234 is disposed between intake port 206 and exhaust port 208 and includes one or more apertures in fluid communication with intake port 206 and exhaust port 208.

Seat 230 is decoupled from housing 202 so that as piston 250 works, the resulting distortion to housing 202 does not affect seat 230. Typically, piston 250 works by reciprocating axially within seat 230 thus opening and closing the aperture(s) to regulate exhaust gas flow between intake port 206 and exhaust port 208.

Seal 240 is disposed between seat 230 and housing 202 proximate second axial end 234 to close the decoupled distance between housing 202 and seat 230 thus preventing, or otherwise minimizing, the escape of gases. Preferably, piston guide 252 is linked to seat 230 so that seat 230 remains aligned with piston 250 and its direction of travel.

Seal 240 is preferably fitted about the periphery of seat 230 and comprises any apparatus or material known in the art to seal the space between seat 230 and housing 202 including, but not limited to, a sufficiently flexible and resilient seal, a flexible seal with a curved or radiused sealing surface such as a Microplex™ seal, or a piston ring.

Thus, the present invention provides for the effective management of exhaust gases by eliminating distortion to a piston seat, thereby preventing the escape of gases that follow such distortion. The present invention is particularly applicable where temperature cycles occur, such as in automotive applications.

EXAMPLE

An exhaust gas valve assembly comprising a valve seat and seal assembly in accordance with an embodiment of the present invention was constructed. The valve seat was linked to the piston guide. The assembly functioned successfully in preventing the unwarranted escape of gases as the piston reciprocated within the valve seat.

The preceding example can be repeated with similar success by substituting the generically or specifically described reactants and/or operating conditions of this invention for those used in the preceding example.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. An exhaust gas valve assembly comprising:
   a housing having an intake port, an exhaust port, and a substantially cylindrical cavity defined therein, the cavity having a first end and an opposite second end, the housing defining a housing surface at the first end of the cavity, the housing surface surrounding the cavity and facing away from the second end of the cavity;
   a valve seat having a portion thereof disposed within the cavity, said valve seat having a first axial end secured to the housing and a second axial end, the second axial end being disposed within, but decoupled a distance from, the housing, said second axial end positioned between the intake and exhaust ports, the second axial end defining an opening in fluid communication with an interior of the valve seat, a side wall of the valve seat defining an aperture also in fluid communication with the interior of the valve seat, the valve seat defining a seat surface, the intake port and the exhaust port being in fluid communication with the interior of the valve seat via the opening and aperture in the valve seat, wherein the first axial end of the valve seat defines a flange having an engagement surface that lies against the housing surface so as to axially locate the valve seat relative to the housing;
   a piston received within the interior of the valve seat, one end of said piston defining a piston surface engageable with the seat surface of the valve seat so as to prevent flow between the opening and the aperture of the valve seat, said piston configured to reciprocate axially within the valve seat so as to cause the piston surface to engage and disengage the seat surface and thereby regulate exhaust gas flow between the intake port and the exhaust port; and
   a seal disposed between the housing and the valve seat proximate the second axial end of the valve seat, said seal closing the decoupled distance between the housing and valve seat.

2. The assembly of claim 1 wherein the seat is linked to a piston guide.

3. The assembly of claim 1 wherein the seal comprises a flexible seal.

4. The assembly of claim 1 wherein the seal comprises a curved, radiused sealing surface.

5. The assembly of claim 1 wherein the seal comprises a ring.

6. The assembly of claim 1 wherein the seal comprises a piston ring.

7. The assembly of claim 1 wherein the housing is disposed in an environment subject to temperature cycles.

8. A method for managing exhaust gases comprising:
   providing a housing having an intake port, an exhaust port, and a substantially cylindrical cavity defined therein, the cavity having a first end and an opposite second end, the housing defining a housing surface at the first end of the cavity, the housing surface surrounding the cavity and facing away from the second end of the cavity;
   disposing a portion of a valve seat within the cavity, a first axial end of the valve seat defining a flange having an engagement surface;
   securing the first axial end of the seat to the housing such that the engagement surface of the flange lies against the housing surface and thereby axially locates the valve seat relative to the housing;
   disposing in a decoupled manner a second axial end of the seat within, but a decoupled distance from, the housing and positioning the second axial end between the intake and exhaust ports, the second axial end defining an opening in fluid communication with an interior of the valve seat, a side wall of the valve seat defining an aperture also in fluid communication with the interior of the valve seat, the valve seat defining a seat surface, the intake port and the exhaust port being in fluid communication with the interior of the valve seat via the opening and aperture in the valve seat;
   receiving a piston within the interior of the valve seat, one end of said piston defining a piston surface engageable with the seat surface of the valve seat so as to prevent flow between the opening and the aperture of the valve seat, and configuring the piston to reciprocate axially within the valve seat so as to thereby regulate exhaust gas flow between the intake port and the exhaust port; and
   disposing a seal between the housing and the valve seat proximate the second axial end of the valve seat so that the seal closes the decoupled distance between the housing an valve seat.

9. The method of claim 8 further comprising linking the seat to a piston guide.

10. The method of claim 8 wherein the seal comprises a flexible seal.

11. The method of claim 8 wherein the seal comprises a curved, radiused sealing surface.

12. The method of claim 8 wherein the seal comprises a ring.

13. The method of claim 8 wherein the seal comprises a piston ring.

14. The method of claim 8 further comprising disposing the housing in an environment subject to temperature cycles.

15. The assembly of claim 1, wherein the seat is generally tubular having a radially inner surface and a radially outer surface, wherein a proximal lengthwise portion of the seat adjacent the first axial end has the radially outer surface in contact with an inner surface of the housing, and further comprising a generally tubular piston guide having a radially inner surface and a radially outer surface, the piston guide being disposed within the proximal lengthwise portion of the seat and having the radially outer surface of the piston guide in contact with the radially inner surface of the seat, the radially inner surface of the piston guide engaging the piston to guide the reciprocating movement of the piston.

* * * * *